No. 892,457. PATENTED JULY 7, 1908.
D. J. SMITH.
MULTIPLE TOOL HOLDING SLIDE REST ATTACHMENT FOR LATHES.
APPLICATION FILED JULY 1, 1907.
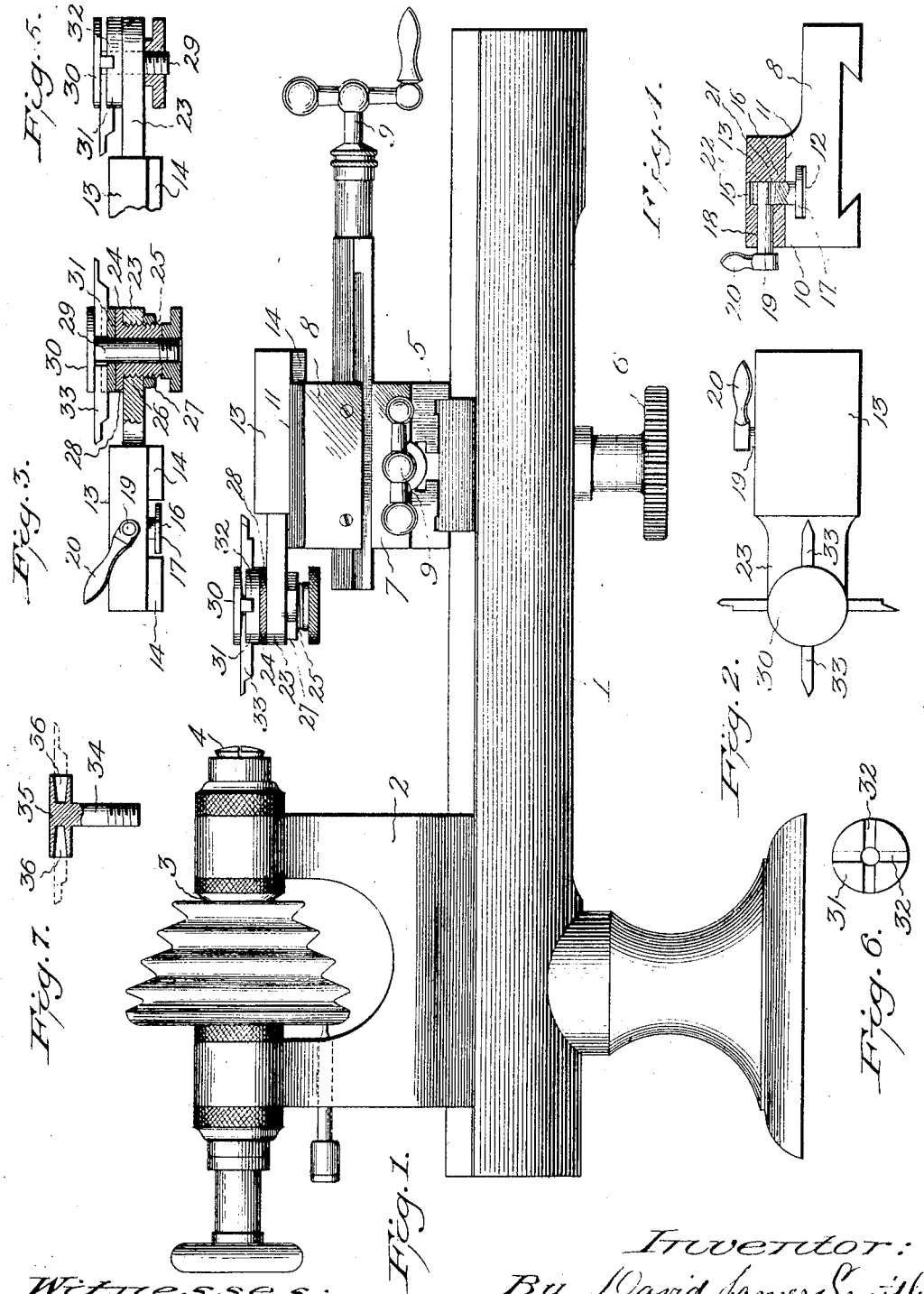
Witnesses:
G. Sargent Elliott
Adella M. Towle
Inventor:
By David James Smith
H. S. Bailey. Attorney.

UNITED STATES PATENT OFFICE.

DAVID J. SMITH, OF DENVER, COLORADO.

MULTIPLE-TOOL-HOLDING SLIDE-REST ATTACHMENT FOR LATHES.

No. 892,457.          Specification of Letters Patent.          Patented July 7, 1908.

Application filed July 1, 1907. Serial No. 381,757.

*To all whom it may concern:*

Be it known that I, DAVID J. SMITH, a citizen of the United States of America, residing in the city and county of Denver and State of Colorado, have invented a new and useful Multiple-Tool-Holding Slide-Rest Attachment for Lathes, of which the following is a specification.

My invention relates to an improvement in rotary multiple tool holding slide rest attachments for lathes; and the objects of my invention are: first, to provide a tool holder for lathes capable of holding a plurality of tools, and which is adjustable vertically and on a horizontal plane. And second, to provide a rotary tool holder for lathes, comprising a body portion, which is adjustable horizontally in an adjustable slide rest, and which is provided with clamping means by which it may be secured in any desired position in said rest, said block having a forward extension in which is mounted a rotary tool holder, comprising a tool clamp adapted to hold a plurality of tools, said clamp being vertically adjustable in said extension. I attain these objects by the mechanism illustrated in the accompanying drawings, in which:

Figure 1, is a side elevation of a lathe provided with my improved multiple tool holder. Fig. 2, is a plan view of the tool holder detached from its slide rest. Fig. 3, is a side elevation partly in section, of the tool holder, showing the parts constituting the same, and tool clamped thereby. Fig. 4, is a transverse sectional view through the clamping means of the tool holder, the said holder being clamped to a slide rest. Fig. 5, is a side elevation partly in section, showing a modification of the tool holding clamp. Fig. 6, is a plan view of the tool holding disk forming a part of the clamp. And Fig. 7, is a view of a farther modification of the tool holder.

Similar letters of reference refer to similar parts throughout the several views.

Referring to the drawings, the numeral 1 represents the bed of a lathe; 2 designates in general the headstock; and 3 designates the spindle of the headstock, which is illustrated provided with a chuck 4. 5 designates the carriage, which is adapted to be clamped at any desired point along the length of the bed by the hand screw 6. The carriage is provided with a transverse slide rest 7, and a longitudinal slide rest 8, both of which are provided with feed screws and handles 9, as is well understood.

The above-described elements are well known parts of metal turning lathes, and do not form any part of my invention, but as my invention is used coöperatively with them they are illustrated and described to show the application of multiple tool holding slide rests to them.

My invention contemplates the placing of an adjustable multiple tool holding slide on the longitudinal slide of the carriage; to this end I form a lug 10 across the top of the carriage, the top of which is finished to form a slideway 11, and in the center of this lug I form a T-shaped guideway slot 12, which extends through the lug parallel with the axial center of the lathe bed and the spindle in the headstock of the lathe. Upon the lug 10 I slidingly fit a block 13, which forms the supporting end of my multiple tool holding rest. This rest block is provided with a central depending key portion 14, which extends along its bottom and fits closely but slidably into the vertical portion of the T slot. At the center of this rest block, a portion of the key is cut away, and an aperture 15 is formed up into the center of the bottom of the block, in which the stem 16 of a clamping disk 17 is slidably fitted. The clamping disk 17 is made large enough in diameter to extend into and fit slidably in the horizontal portion of the T slot of the block. While several ways might be employed to raise and lower the clamping disk to clamp the rest block to the slot and lug of the transverse rest of the lathe, I preferably use a side operating crank pin, which I arrange as follows:

In the opposite side of the rest block from the front side of the lathe, I form a hole 18, which extends into the side of the block far enough to intersect the hole 15, that extends up into the bottom of the block, and in this hole I fit loosely a pin 19, the outer end of which is provided with a handle 20, which stands at right angles to the pin at the side of the block. The inner end of the pin extends loosely through a hole 21, formed in the top end of the stem of the clamping button, and an eccentric wrist pin portion 22 is formed on the pin adjacent to its end, which bears in the hole in the top of the pin; consequently when the pin 19 is turned to bring its eccentric wrist pin portion to the top of its rotative plane, it raises the stem and disk and causes the disk to draw the block down and clamp it to the lug, and when the pin is turned to move the eccentric down, it releases the disk and permits the block to be moved along the lug of the transverse slide rest.

The end of the block facing the headstock of the lathe, is provided with a forwardly extending arm 23, the free end of which is provided with a tool holding device which consists of a hollow screw 24, which comprises preferably a vertically adjustable sleeve 25 that is threaded into a threaded aperture 26, formed in the center of the free end of the arm of the block. This sleeve portion extends through the arm far enough to receive a check nut 27, which is threaded to its end and is adapted to be screwed against the under side of the arm and clamp the sleeve to the arm, in adjusted positions against accidental movement. This sleeve is provided at its top end with a thin flange 28, the peripheral edge of which is knurled in order to present a frictional surface to the fingers of the operator. This adjustable sleeve is provided with an axial hole, which extends entirely through it, and a clamping bolt 29, extends rotatably through the sleeve and far enough below it to receive a disk-shaped thumb nut, the peripheral surface of which is knurled to present a frictional surface to the fingers of the operator. This bolt is provided with a thin head portion 30, which is preferably round and of the size of flange of the adjustable sleeve. Upon the bolt a tool disk 31 is placed, which fits rotatably on the bolt, and is preferably of the same size in diameter as the flange of the adjustable sleeve, and of the head of the bolt; and the upper surface of this tool holding disk is provided with a plurality of radial recesses 32, spaced at equi-distances apart, four being shown in the drawing, but more or less may be used as desired. These recesses are made of a trifle shallower depth than the thickness of the tool steel employed for making the tools 33, so that the top surface of the tools will project slightly above the top surface of the tool-disk and permit the under side of the head of the bolt to rest on them. The tools 33 are made of straight bar tool steel, and the tool recesses in the disk are made to fit them closely but at the same time to permit the tools to be pushed slidingly into them from the edge of the disk.

If desired, the threaded adjustable sleeve and its nut may be dispensed with, and only the bolt and tool holding disk may be employed, as shown in Fig. 5, in which case the tool disk is arranged so that the top surfaces of the tools are in axial alinement with the axial center of the spindle of the headstock of the lathe, but when the adjustable sleeve is employed, the tools can be set either at the axial center or above or below it, as desired, and be readily changed from one position to another as often as desired.

In Fig. 7, I illustrate a bolt 34, having a head 35, provided with conical tool holding apertures 36, and this bolt may be used alone, and the tool holder 31, dispensed with.

The operation is as follows: The adjustable sleeve may be set to raise the tools at or above or below the center of the headstock, by loosening its check nut, and then turning the sleeve in the threaded hole in the arm to raise or lower the sleeve as desired; then when this adjustment of the tool is made, the check nut of the sleeve is screwed against the under side of the arm and locks the sleeve against accidental movement. The tool holding disk can be pivotally rotated on the bolt to bring any tool to the work in the chuck 4 of the spindle, by loosening the thumb nut at its lower end, which frees the disk, allowing the operator to grasp a tool and swing it to the desired position to operate on the work, and the tool is secured in that position by screwing the thumb nut onto the threaded end of the bolt and against the lower end of the adjustable sleeve, which draws the head of the bolt down onto the top surfaces of the tools and clamps them in their recesses in the tool holding disk, and also clamps the tool holding disk against the top of the flange of the adjustable sleeve.

Having described my invention, what I claim as new and desire to secure by Letters Patent, is:

1. In a tool holding slide rest attachment for lathes, the combination of a supporting arm adapted to be secured to said slide rest, an adjustable sleeve threaded in a perforation in said arm, a nut on said sleeve adapted to secure said sleeve to said arm in adjusted positions, a bolt extending through said sleeve, a nut on said bolt, a tool holding disk rotatably mounted on said bolt adapted to rest on and to be clamped against said sleeve, and adapted to hold tools in position to be clamped in said disk by the head of said bolt.

2. In a tool holding attachment for the rests of lathes, the combination with a supporting arm adapted to be attached to the rest of a lathe, of a threaded sleeve provided with a flanged head at one end, adapted to rest on one side of said support, and a nut threaded to its opposite end, and adapted to engage the opposite side of said supporting arm, a clamping bolt having a head portion extending loosely through said sleeve, a tool holding disk rotatably mounted on said bolt between its head and the flange of said sleeve, provided with a plurality of radial tool holding recesses in its side facing said bolt's head, a plurality of tools fitting said recesses and arranged to project above the surface of said disk and to be engaged by the under side of the head of said bolt, and a nut threaded to the free end of said bolt and adapted to draw the head of said bolt to clamp said tools in said disk and said disk to the flange of said sleeve.

In testimony whereof I affix my signature in presence of two witnesses.

DAVID J. SMITH.

Witnesses:
G. SARGENT ELLIOTT,
ADELLA M. FOWLE.